United States Patent

Forster et al.

[15] 3,687,014
[45] Aug. 29, 1972

[54] SERVO-STEERING SYSTEM FOR MOTOR VEHICLES

[72] Inventors: Hans-Joachim M. Forster, Stuttgart-Riedenberg; Klaus Katz, Stutgart, both of Germany

[73] Assignee: Daimler-Benz Aktiengesellschaft, Stuttgart-Unterturk-Rein, Germany

[22] Filed: Oct. 29, 1971

[21] Appl. No.: 193,643

Related U.S. Application Data

[63] Continuation of Ser. No. 28,188, April 14, 1970, which is a continuation of Ser. No. 759,981, Sept. 16, 1968.

[52] U.S. Cl. ..................................92/33, 91/380
[51] Int. Cl. ................................................F01b 3/00
[58] Field of Search....92/31, 33, 113, 136, 165, 168; 91/368, 380; 180/79.2; 308/190, 194

[56] References Cited

UNITED STATES PATENTS

| | | | |
|---|---|---|---|
| 2,695,203 | 11/1954 | Andersen | 308/194 X |
| 2,765,778 | 10/1956 | Gerry et al. | 92/31 |
| 3,002,501 | 10/1961 | Banker | 91/380 X |
| 3,010,335 | 11/1961 | Foerster et al. | 91/380 X |
| 3,054,136 | 9/1962 | Schlage et al. | 92/136 X |
| 3,365,253 | 1/1968 | Haller | 308/194 X |
| 845,778 | 3/1907 | Hachfield | 308/194 X |
| 3,457,796 | 7/1969 | Leach et al. | 308/194 X |

FOREIGN PATENTS OR APPLICATIONS

| | | |
|---|---|---|
| 1,138,652 | 10/1962 | Germany |
| 1,139,399 | 11/1962 | Germany |

*Primary Examiner*—Martin P. Schwadron
*Assistant Examiner*—Leslie J. Payne
*Attorney*—Craig & Antonelli

[57] ABSTRACT

A servo-steering device for motor vehicles in which a steering spindle part adapted to be connected with the steering wheel is rotatably supported within the steering gear housing while a working piston, drivingly connected with the steering gear output shaft, is displaceably arranged within the housing; at least one seal is arranged between the working piston and the steering spindle part; the steering spindle part is also pivotally supported at least in the housing of the steering gear. The pivotal support includes a bearing race which permits a slight radial movement of the steering spindle such that the steering spindle is both rotatably and pivotally supported in the housing.

15 Claims, 1 Drawing Figure

Patented Aug. 29, 1972
3,687,014
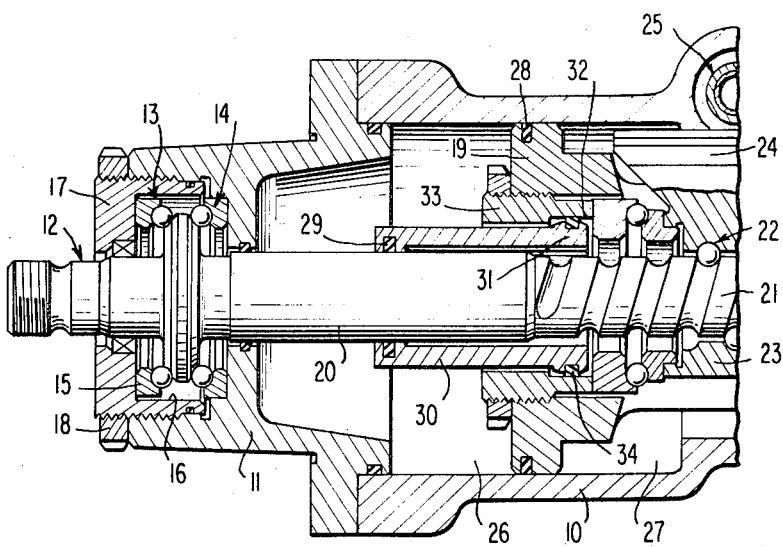
INVENTORS
HANS-JOACHIM M. FÖRSTER
KLAUS KATZ
BY Craig & Antonelli
ATTORNEYS 3,687,014

SERVO-STEERING SYSTEM FOR MOTOR VEHICLES

This application is a continuation of our copending application, Ser. No. 28,188, filed Apr. 14, 1970, said application Ser. No. 28,188 being a streamlined continuation of Ser. No. 759,981, filed Sept. 16, 1968.

BACKGROUND OF THE INVENTION

The present invention relates to a servo-steering system for motor vehicles in which a steering spindle part, adapted to be connected at the input of the steering gear with the steering wheel, is rotatably supported within the housing of the steering gear and a working piston concentric to the steering spindle is displaceable within the housing which piston is drivingly connected with the steering shaft at the output of the steering gear for the assist of the manual force.

The present invention aims at improving a servo steering device of the aforementioned type. For this purpose, provision is made according to the present invention that at least one seal is arranged directly between the working piston and the steering spindle part on the inside of the housing.

The guide bush or sleeve necessary heretofore for sealing the pressure medium spaces on both sides of the working piston is dispensed with by the present invention. This guide bush or sleeve is rigidly secured with the prior art servo-steering systems of the type with which the present invention is concerned, for example, at a housing cover on the end face of the steering gear. The guide sleeve or bush has to be arranged in a pressure-and fluid-tight manner both with respect to the housing cover and the steering spindle part. These structural expenditures are avoided by the present invention.

According to a further feature of the present invention, the steering spindle part on the inside of the housing can be supported pivotally at least at the housing of the steering gear. On the one hand, alignment errors in the gear are compensated for thereby and, on the other, the sealing between working piston and steering spindle part is facilitated thereby.

These measures can be further completed according to a further feature of the present invention in that a sleeve or ring-shaped seal support element is arranged between the working piston and the steering spindle part on the inside of the housing and is pivotally connected with one of the two parts to be sealed with respect to each other.

Accordingly, it is an object of the present invention to provide a servo-steering system of the type described above which eliminates by simple means the aforementioned shortcomings and drawbacks encountered in the prior art.

A further object of the present invention resides in a servo-steering device for motor vehicles which economizes the number of parts required to establish a pressure and fluid tight seal.

A further object of the present invention resides in a servo-steering device for motor vehicles which is characterized not only by simplicity and low structural expenditures but additionally facilitates the sealing between working piston and steering spindle part.

These and further objects, features and advantages of the present invention will become more obvious from the following description when taken in conjunction with the accompanying drawing which shows, for purposes of illustration only, one embodiment in accordance with the present invention, and wherein:

BRIEF DESCRIPTION OF THE DRAWINGS

The single FIGURE is a partial longitudinal cross-sectional view through a steering gear in accordance with the present invention illustrating only those details essential to the present invention, the other parts being of conventional construction.

DETAILED DESCRIPTION OF THE DRAWINGS

Referring now to the drawings, the housing 10 of the steering gear is closed off by a housing cover 11 in a pressure- and fluid-tight manner. A steering spindle part at the input side of the steering gear and generally designated by reference numeral 12 is rotatable but axially immovably supported within the housing 10 by means of inclined ball bearings generally designated by reference numerals 13 and 14. The axially outer ball bearing 13 includes a bearing race 15 whose outer diameter is smaller than a bore 16 of a threaded part 17 accommodating this race 15. The threaded part 17 is threadably connected with the housing cover 11 and is secured by means of a counter nut 18. The steering spindle part 12 can carry out a limited pivotal movement with respect to the housing 10 as a result of the radial play between the race 15 and the threaded part 17.

A working piston 19 which is displaceably guided in the housing 10, is operatively connected in a conventional and therefore non-illustrated manner by way of a toothed rack profile with a toothed segment of a steering shaft at the output side of the steering gear.

The steering spindle part 20 on the inside of the housing 10 is constructed in one piece with a steering worm, 21. The steering worm, 21 is spirally movably connected with a steering nut 23 by way of a circulating ball system generally designated by reference numeral 22 and of conventional construction. The steering nut 23, in its turn, is rotatably but axially immovably supported within the working piston 19 and can carry out only a limited rotary movement with respect to the housing 10. This limited rotary movement is transmitted by a radial lever arm 24 of the steering nut 23 to a control slide valve generally designated by reference numeral 25 and displaceably supported within the housing 10. Depending on the position of the control slide valve 25, the one or the other working space 26 and 27 formed by the working piston 19 in the housing can be connected with a power source for the pressure medium. Since the control slide valve 25 and associated hydraulic system is of conventional, known construction and forms no part of the present invention, a detailed description thereof is dispensed with herein. The working spaces 26 and 27 are sealed with respect to one another by a radially outer seal 28 between housing 10 and working piston 19 as well as by a radially inner seal 29 directly between the housing inner steering spindle part 20 and the working piston 19. The inner seal 29 consists of a low-friction material and slides on the spindle part 20. The seal 29 is arranged in a sleeve-shaped support element 30 which is provided with a flange-like extension 31. The flange-like extension 31 engages both with axial as well as with radial play in a groove 32 which is radially accommodated in a bearing part 33 threadably connected with the working piston 19. A further seal 34 is effective between this bearing part 33 and the sleeve-shaped support element 30. As a result of the play between the flange 31 and the groove 32, the seal support element 30 is able to carry out a certain angular movement both with respect to the working piston 19 as also with respect to the spindle part 20. As a result thereof, alignment and manufacturing errors are compensated for and the sealing effect is improved.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A servo-steering device for motor vehicles comprising a steering gear housing, a steering spindle rotatably supported within said housing, means adjacent one end of said spindle outside of said housing for connecting the spindle to a steering wheel, said spindle being pivotally supported at least at a first support in said housing, a working piston displaceably mounted within said housing, said working piston being drivingly connected with an output shaft of the steering gear for assisting manual turning forces introduced to the steering spindle through the steering wheel, seal means arranged for sealing the spindle with respect to the space between the working piston and the housing, said seal means operatively engaging said spindle at a place spaced from said first support.

2. A servo-steering device according to claim 1, wherein said first support includes ball-bearing means, said ball-bearing means including a first and second set of ball-bearings engaged on opposite sides of a ridge provided on the spindle, said first set being in engagement with a first bearing race fixed to said housing, said second set being in engagement with a second bearing race, and wherein said second bearing race is radially movable within said housing.

3. A servo-steering device according to claim 2, wherein said second bearing race is disposed outwardly from the first bearing race toward the steering wheel connecting means.

4. A servo-steering device according to claim 1, wherein said seal means includes at least one seal arranged inside of said housing between the working piston and the steering spindle, said at least one seal being arranged for operatively engaging said spindle at a place spaced from said first support.

5. A servo-steering device according to claim 1, wherein said seal means comprises seal support means arranged between the working piston and said steering spindle part, said seal support means being pivotally connected with said working piston.

6. A servo-steering device according to claim 5, wherein said seal support means is of annular shape.

7. A servo-steering device according to claim 5, wherein said seal support means includes flange means and bearing means threadably connected with said piston and provided with radial groove means, said flange means engaging in said groove means.

8. A servo-steering device according to claim 7, further comprising additional seal means arranged in said flange means.

9. A servo-steering device according to claim 8, wherein said seal support means includes sleeve means accommodating therein the first-mentioned seal which is effective between said sleeve means and said steering spindle part.

10. A servo-steering device according to claim 9, wherein the working piston is substantially concentric to the steering spindle part.

11. A servo-steering device according to claim 5, wherein said seal support means includes sleeve means accommodating therein the first-mentioned seal which is effective between said sleeve means and said steering spindle part.

12. A servo-steering device according to claim 5, wherein the working piston is substantially concentric to the steering spindle part.

13. A servo-steering device according to claim 12, wherein said seal support means includes sleeve means accommodating therein the first-mentioned seal means which is effective between said sleeve means and said steering spindle part.

14. A servo-steering device according to claim 1, wherein said first support includes radially movable bearing means for rotatably and pivotally supporting said spindle.

15. A servo-steering device according to claim 2, wherein said seal means comprises seal support means arranged between the working piston and said steering spindle part, said seal support means being pivotally connected with said working piston.

* * * * *